United States Patent
Baird et al.

(10) Patent No.: US 7,596,150 B2
(45) Date of Patent: Sep. 29, 2009

(54) SYSTEM AND METHOD FOR CONSOLIDATING MEDIA SIGNALING TO FACILITATE INTERNET PROTOCOL (IP) TELEPHONY

(75) Inventors: Randall B. Baird, Austin, TX (US); Parameswaran Kumarasamy, San Jose, CA (US); Steven G. Fry, Oakland, CA (US)

(73) Assignee: Cisco Technology, Inc., San Jose, CA (US)

( * ) Notice: Subject to any disclaimer, the term of this patent is extended or adjusted under 35 U.S.C. 154(b) by 266 days.

(21) Appl. No.: 11/363,810

(22) Filed: Feb. 27, 2006

(65) Prior Publication Data

US 2007/0201448 A1 Aug. 30, 2007

(51) Int. Cl.
*H04J 3/16* (2006.01)
(52) U.S. Cl. .............. 370/466; 370/467; 370/401; 370/351; 370/356
(58) Field of Classification Search ........... 370/352, 370/401, 466, 522, 356
See application file for complete search history.

(56) References Cited

U.S. PATENT DOCUMENTS

| | | | | |
|---|---|---|---|---|
| 3,963,874 | A | 6/1976 | Pommerening et al. | 179/18 |
| 4,809,321 | A | 2/1989 | Morganstein et al. | 379/211 |
| 6,501,750 | B1 | 12/2002 | Shaffer et al. | 370/353 |
| 6,510,162 | B1 | 1/2003 | Fijolek et al. | 370/432 |
| 6,546,087 | B2 | 4/2003 | Shaffer et al. | 379/90.01 |
| 6,567,505 | B1 | 5/2003 | Omori et al. | 379/84 |
| 6,584,093 | B1 * | 6/2003 | Salama et al. | 370/351 |
| 6,601,099 | B1 | 7/2003 | Corneliussen | 709/224 |
| 6,614,899 | B1 | 9/2003 | Sollee et al. | 379/218.01 |
| 6,615,236 | B2 | 9/2003 | Donovan et al. | 709/203 |
| 6,625,141 | B1 | 9/2003 | Glitho et al. | 370/352 |
| 6,636,594 | B1 | 10/2003 | Oran | 379/201.01 |
| 6,658,095 | B1 | 12/2003 | Yoakum et al. | 379/93.01 |
| 6,661,799 | B1 | 12/2003 | Molitor | 370/401 |
| 6,665,723 | B2 | 12/2003 | Trossen | 709/227 |
| 6,678,735 | B1 | 1/2004 | Orton et al. | 709/230 |

(Continued)

OTHER PUBLICATIONS

Hemant Agrawal et al, SIP-H.323 Interworking, Jul. 13, 2001, Internet Engineering Task Force, Internet Draft, Entire Document.*

(Continued)

*Primary Examiner*—Curtis Kuntz
*Assistant Examiner*—Phung-Hoang J Nguyen
(74) *Attorney, Agent, or Firm*—Baker Botts L.L.P.

(57) ABSTRACT

A system and method for consolidating media signaling to facilitate IP telephony includes receiving a first message exchange in a first protocol from a first endpoint to negotiate a media path with a second endpoint. It is determined to consolidate the first message exchange with additional message exchanges received from the first endpoint in the first protocol. A second message exchange is received in the first protocol from the first endpoint, and information derived from the first message exchange and the second message exchange is consolidated. A first message exchange in a second protocol is initiated to the second endpoint according to the information consolidated from the first and second message exchanges in the first protocol. One or more media flows is facilitated over the media path between the first and second endpoints according to the first and second message exchanges in the first protocol and the first message exchange in the second protocol.

19 Claims, 4 Drawing Sheets

U.S. PATENT DOCUMENTS

| | | | | |
|---|---|---|---|---|
| 6,684,147 | B2 | 1/2004 | Park et al. | 701/71 |
| 6,731,625 | B1 | 5/2004 | Eastep et al. | 370/352 |
| 6,738,390 | B1 | 5/2004 | Xu et al. | 370/467 |
| 6,754,181 | B1 | 6/2004 | Elliott et al. | 370/252 |
| 6,760,322 | B1 | 7/2004 | Fukuda et al. | 370/352 |
| 6,785,246 | B2 | 8/2004 | Foti | 370/261 |
| 6,788,676 | B2 | 9/2004 | Partanen et al. | 370/352 |
| 2003/0016627 | A1* | 1/2003 | MeLampy et al. | 370/235 |
| 2003/0091026 | A1* | 5/2003 | Penfield et al. | 370/352 |
| 2005/0232246 | A1* | 10/2005 | Dowling | 370/352 |
| 2006/0007954 | A1* | 1/2006 | Agrawal et al. | 370/466 |

OTHER PUBLICATIONS

R. Mahy et al., "Remote Call Control in SIP using the REFER method and the session-oriented dialog package," Internet Draft (no longer posted on Internet). The Internet Society, 35 pages, Feb. 2004.

R. Mahy et al., "Remote Call Control in Session Initiation Protocol (SIP) using the REFER method and the session-oriented dialog package," Internet Draft, http://www.ietf.org/internet-drafts/draft-mahy-sip-remote-cc-03.txt, The Internet Society, 14 pages, Mar. 5, 2006.

R. Mahy, et al., "The Session Initiation Protocol (SIP) 'Join' Header", The Internet Society, RFC 3991, http://www.ietf.org/rfc/rfc3911.txt, 15 pages, Oct. 2004.

R. Mahy, et al., "The Session Initiation Protocol (SIP) 'Replaces' Header," The Internet Society, RFC 3891, http://www.ietf.org/rfc/rfc3891.txt, 15 pages, Sep. 2004.

M. Soroushnejad, et al. "Implementing Bridged Line Appearances (BLA) Using Session Initiation Protocol (SIP)," Internet Draft http://bgp.potaroo.net/ ietf/html/ids/draft-anil-sipping-bla-03.txt, 33 pages, Jun. 15, 2006.

J. Rosenberg et al., "An Invite Initiated Dialog Event Package for the Session Initiation Protocol (SIP)," RFC 4235, http://ietfreport.isoc.org/idref/draft-ietf-sipping-dialog-package-06.txt, 38 pages, Apr. 12, 2005.

J. Rosenberg, H. Schulzrinne, G. Camarillo, A. Johnston, J. Peterson, R. Sparks, M. Handley, and E. Schooler, "SIP: Session Initiation Protocol ," Network Working Group, RFC 3261, 269 pages, Jun. 2002.

Schulzrinne et al., "RTP Payload for DTMF Digits, Telephony Tones and Telephony Signals," Network Working Group, pp. 1-27, May 2000.

Roach, "Session Initiation Protocol (SIP)-Specific Event Notification," Network Working Group, pp. 1-36, Jun. 2002.

Rosenberg et al., "An Offer/Answer Model with the Session Description Protocol (SDP)," Network Working Group, pp. 1-24, Jun. 2002.

Rosenberg et al., "Caller Preferences for the Session Initiation Protocol (SIP)," Network Working Group, pp. 1-25, Aug. 2004.

Schulzrinne et al., "Session Initiation Protocol (SIP)-H.323 Interworking Requirements," Network Working Group, pp. 1-15, Jul. 2005.

Notification of Transmittal of the International Search Report and the Written Opinion of the International Searching Authority, or the Declaration, International Application No. PCT/US07/00311, 8 pages, mailed Oct. 16, 2007.

* cited by examiner

SYSTEM AND METHOD FOR CONSOLIDATING MEDIA SIGNALING TO FACILITATE INTERNET PROTOCOL (IP) TELEPHONY

TECHNICAL FIELD

This invention relates generally to the field of telecommunications and, more specifically, to a system and method for consolidating media signaling to facilitate IP telephony.

BACKGROUND

Interoperability between the H.323 and Session Initiation Protocol (SIP) protocols provides for greater connectivity in IP telephony. A device to facilitate this interoperability is often referred to as a signaling gateway. When media connections are opened and closed between endpoints, an exchange of H.323 and SIP messages occurs. For example, opening a media connection causes a message exchange to occur between the H.323 endpoint and the gateway, and another message exchange to occur between the gateway and the SIP endpoint. Closing a media connection causes a similar message exchange to occur between endpoints and the gateway. If video is added to a communication session, additional media is opened and closed, which causes even more message exchanges. Using conventional techniques, the strict conversion of H.323 messages to SIP messages increases the load on devices and networks and delays the establishment of a media connection.

SUMMARY OF THE DISCLOSURE

In accordance with the present invention, disadvantages and problems associated with previous techniques of exchanging messages for opening and closing media connections may be reduced or eliminated.

According to one embodiment of the present invention, a system and method for consolidating media signaling to facilitate IP telephony includes receiving a first message exchange in a first protocol from a first endpoint to negotiate a media path with a second endpoint. It is determined to consolidate the first message exchange with additional message exchanges received from the first endpoint in the first protocol. A second message exchange is received in the first protocol from the first endpoint, and information derived from the first message exchange and the second message exchange is consolidated. A first message exchange in a second protocol is initiated to the second endpoint according to the information consolidated from the first and second message exchanges in the first protocol. One or more media flows is facilitated over the media path between the first and second endpoints according to the first and second message exchanges in the first protocol and the first message exchange in the second protocol.

Certain embodiments of the invention may provide one or more technical advantages. A technical advantage of one embodiment includes reducing the number of messages exchanged in negotiation or renegotiation of the media session. Reducing messages reduces the delay in establishment of Realtime Transport Protocol (RTP) sessions and improves device and network performance. Instead of indicating establishment and tear down of media sessions for each direction between H.323 and SIP endpoints and for every instance of a stream, a signaling gateway consolidates the messages and indicates the updated state using a single message exchange.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is made to the following description, taken in conjunction with the accompanying drawings, wherein like reference numerals represent like parts, in which.

DETAILED DESCRIPTION OF THE DRAWINGS

Figure 1:
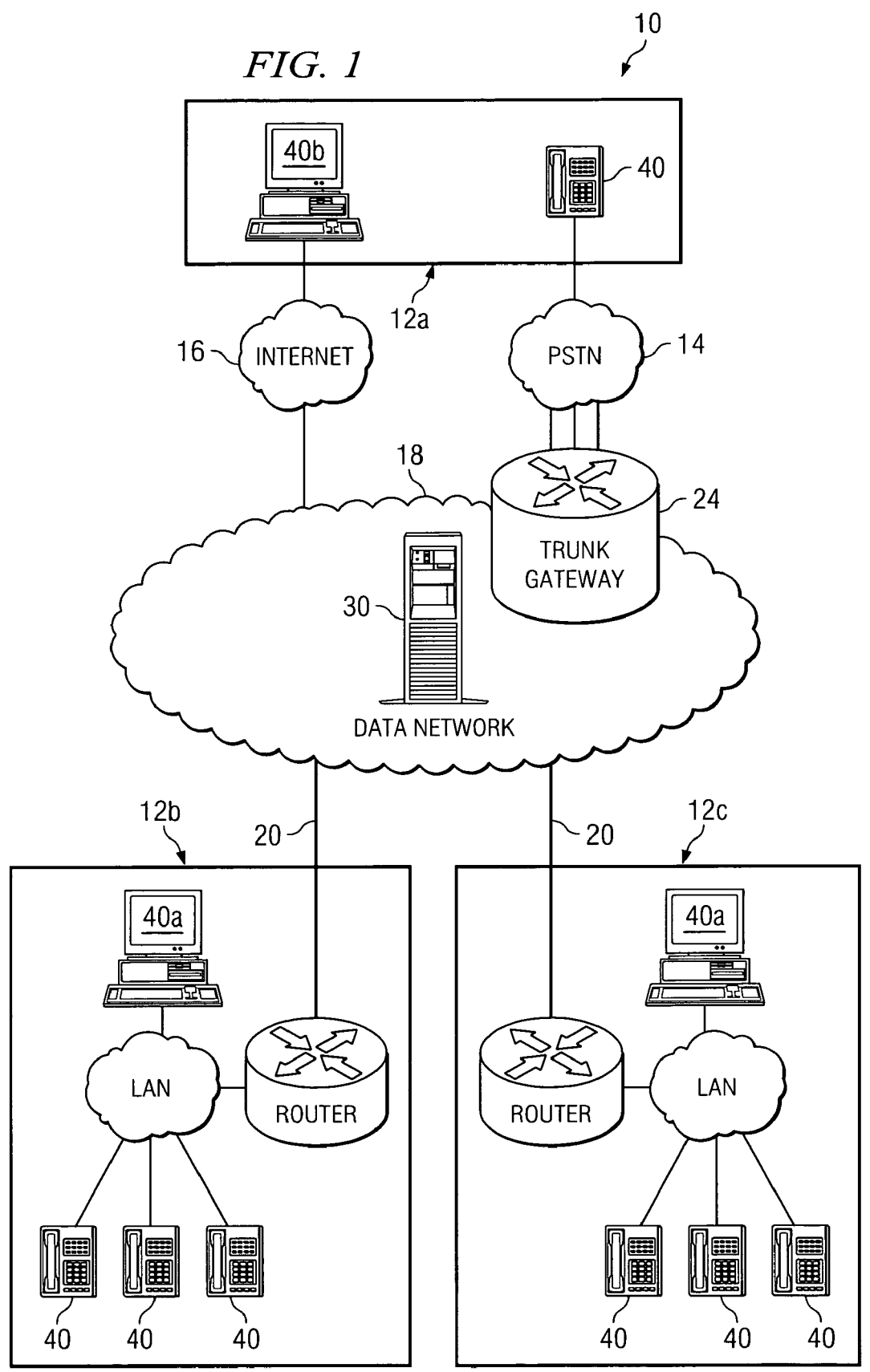
FIG. 1 is a block diagram illustrating a communication system that facilitates IP telephony in accordance with one embodiment of the present invention.

FIG. 1 is a block diagram illustrating a communication system 10 that facilitates IP telephony in an environment supporting interoperability between H.323 and SIP. Communication system 10 includes sites 12a-12c that participate in communication using a public switched telephone network (PSTN) 14, an Internet 16, a data network 18, a link 22, a trunk gateway 24 and/or a call manager 30.

Sites 12 represent any suitable location, such as a residential location or a business, that include endpoints 40. Endpoints 40 may be any combination of hardware and/or software that provide services, such as establishment of communication sessions, for a user. A communication session, or call, may refer to an active communication between endpoints 40, measured from endpoint to endpoint. Information is communicated during a communication session. Information may refer to voice, data, text, audio, video, multimedia, control, signaling, other information, or any combination of the preceding. System 10 may communicate information in packets or any other format or protocol, such as H.323 or SIP.

Thus, some of endpoints 40 are SIP-compatible elements that include hardware and/or software that is operable to receive and to transmit data (directly or indirectly) and to implement the consolidation of media signaling as outlined herein. Note that the term "endpoint" encompasses a myriad of potential devices and infrastructure that may benefit from the operations of system 10. Endpoints 40 may be a personal digital assistant (PDA), a cellular telephone, a standard telephone (which may be coupled to a personal computer) an IP telephone, a personal computer, a laptop computer, a computer running telephony software, a mobile telephone, or any other suitable device or element (or any appropriate combination of these elements) that is operable to receive data or information. Each endpoint 40 may also include suitable network equipment and appropriate infrastructure (e.g., switches, routers, LANs, gateways, etc.) to facilitate a SIP session. FIG. 1 illustrates only one set of example devices that may be used within system 10. The present invention is replete with numerous alternatives that could be used to facilitate the operations of system 10.

It should also be noted that the internal structure of the endpoints are malleable and can be readily changed, modified, rearranged, or reconfigured in order to achieve their intended operations, as they pertain to the consolidation of media signaling. Note also that the endpoints can each include a link to call manager 30, which is operable to communicate with any number of endpoints/user agents/devices.

In addition to endpoints 40, sites 12b and 12c may include a local area network (LAN), a router, a switch, or a line gateway. Sites 12b and 12c communicate with data network 18 over link 20. Link 20 may include any suitable link, such as a digital subscriber line (DSL) link, a T1 link, a fiber optic link, or a wireless link.

Call manager 30 manages endpoints 40 and manages the communication between endpoints 40. Call manager 30 is an application that controls call processing, routing, telephone features and options (such as call hold, call transfer, and caller identification), device configuration, and other telephony functions and parameters within system 10. Call manager 30 controls endpoints 40 coupled to network 18 or endpoints 40 may couple directly to call manager 30

In one embodiment, call manager 30 is a Call Manager element, which is manufactured by Cisco Systems, Inc. of San Jose, Calif. The Call Manager element readily accommodates multiple signaling protocols, including both SIP and H.323 In other embodiments, call manager 30 is any suitable component (e.g. a gateway, a switch, a router, a bridge, a state machine, a processor, etc.) that is operable to interface with endpoints/end-users.

Software and/or hardware may reside in call manager 30 to achieve the teachings of the media signaling consolidation feature of the present invention, as outlined herein. However, due to its flexibility, call manager 30 may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of call manager 30 in the context of communication system 10 and, accordingly, it should be construed as such.

In one embodiment of system 10, call manager 30 facilitates interoperability between H.323 endpoints 40 and SIP endpoints 40 by implementing software to function as an H.323-SIP signaling gateway. Call manager 30 translates H.323 call signaling to SIP and vice-versa. Call manager 30 includes H.323 and SIP stacks that provide for operation as a gateway between H.323 and SIP. The gateway software initializes the stacks and translates the signaling from one type to the other. For instance, when call manager 30 receives an incoming H.323 SETUP message, it sends an outgoing SIP INVITE message. In the illustrated embodiment, call manager 30 consolidates media signaling to reduce unnecessary messages and to improve the operation of system 10.

In operation, a communication session begins between a H.323 endpoint 40a and a SIP endpoint 40b. While establishing the communication session, call manager 30 establishes a media path by opening channels. Several messages are exchanged to open a channel. In H.323, channels are opened unidirectionally. A single message opens a channel to send media or receive media, but a single message cannot open a channel to send and receive media. Therefore, two messages are needed to establish a bidirectional call to send and receive media. In SIP, channels may be opened either bidirectionally or unidirectionally. The directionality is controlled by attributes placed in the Session Description Protocol (SDP) attached to the messages that make up the SIP INVITE transaction. Traditionally, to facilitate communication between H.323 endpoint 40a and SIP endpoint 40b, call manager 30 sent an INVITE to establish an unidirectional media session upon receipt of the first H.323 request to open a unidirectional channel, then sent a subsequent INVITE that converted the existing media session to a bidirectional session upon receipt of the second H.323 unidirectional channel request. The duplication in messaging consumed network resources and decreased performance.

Call manager 30 consolidates the messages received to provide bidirectional communication without duplicating messages. For example, call manager 30 receives a message to open a channel to send media from H.323 endpoint 40a. Rather than providing an INVITE transaction to SIP endpoint 40b that only includes sending media, call manager 30 waits to receive another message from H.323 endpoint 40a that opens a channel for receiving media. Upon receiving this message, call manager 30 provides a single INVITE transaction to SIP endpoint 40b that provides for sending and receiving media. A media path is established for sending and receiving media, and the communication session begins between H.323 endpoint 40a and SIP endpoint 40b.

Modifications, additions, or omissions may be made to system 10. For example, system 10 may include any suitable number of sites 12 and may facilitate communication between any suitable number of sites 12. As another example, a plurality of call managers 30 may communicate with each other using either the H.323 or SIP protocols. As yet another example, call manager 30 consolidates messages received from SIP endpoint 40b and provides the information to H.323 endpoint 40a. As yet another example, call manager 30 may include a timer that facilitates consolidation by initiating and terminating consolidation. Moreover, the operations of system 10 may be performed by more, fewer, or other components. Additionally, operations of system 10 may be performed using any suitable logic.

Figure 2:
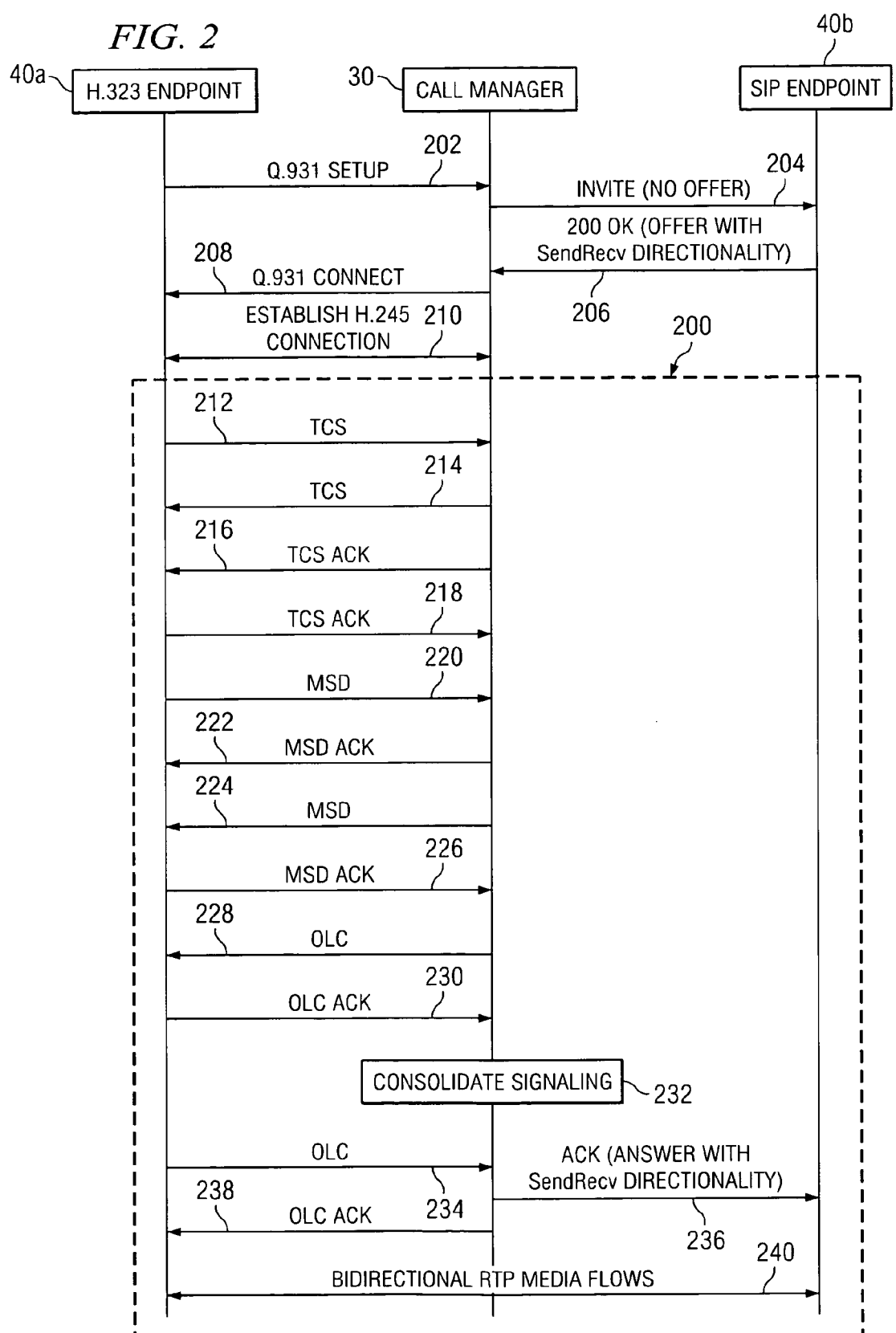
FIG. 2 is a call-flow diagram illustrating consolidation of media signaling during establishment of an audio call.

FIG. 2 is a call-flow diagram illustrating consolidation of media signaling during establishment of an audio call. Negotiation of the audio call is implemented using an H.245 slow-start method. In this method, a separate H.245 channel is established, rather than embedding FastStart elements directly into the Q.931 messages. H.323 endpoint 40a sends a Q.931 setup to call manager 30 at message 202. Q.931 is used to establish a transmission control protocol (TCP) connection for H.245. Call manager 30 sends an empty INVITE to SIP endpoint 40b at message 204. The INVITE conforms to the RFC3264 offer-answer procedures as a delayed offer, and therefore, does not include an SDP message containing specific session establishment information about the call, but establishes the possibility of a call between H.323 endpoint 40a and SIP endpoint 40b. SIP endpoint 40b replies by sending a 200 OK at message 206, which includes an SDP offer containing port information for SIP endpoint 40b and other capabilities of SIP endpoint 40b if a media path is to be established between H.323 endpoint 40a and SIP endpoint 40b. The 200 OK includes an offer that is bidirectional with send/receive capabilities. Call manager 30 sends a Q.931 connect message 208 to H.323 endpoint 40a, which indicates that SIP endpoint 40b has answered the call. In another embodiment, SIP endpoint 40b sends a provisional response indicating, for example, that the endpoint is ringing and call manager 30 sends a corresponding Q.931 alerting message. H.323 endpoint 40a establishes an H.245 connection with call manager 30 at message 210. The H.245 protocol is used to control the establishment and closure of media channels within the context of a call and to perform conference control.

Media establishment procedures 200 are implemented to initiate the communication session. H.323 endpoint 40a sends a Terminal Capability Set (TCS) message to call manager 30 at message 212 with its media capabilities. The TCS message includes the media capabilities, such as the type of codes H.323 endpoint 40a is able to use. Call manager 30 sends a TCS message to H.323 endpoint 40a at message 214. This TCS contains capabilities that correspond to those received in the SDP offer message contained in the 200 OK response in message 206. Each TCS message is acknowledged between H.323 endpoint 40a and call manager 30 in messages 216 and 218.

A master/slave determination (MSD) occurs during call-setup procedures 200. For example, H.323 endpoint 40a sends a MSD to call manager 30 in message 220, and call manager 30 acknowledges the MSD in message 222. The inverse occurs in following messages with call manager 30 sending a MSD to H.323 endpoint 40a in message 224, and H.323 endpoint 40a acknowledging the MSD in message 226.

Media channels are opened using open logical channel (OLC) messages and OLC acknowledgements. Call manager 30, acting on behalf of SIP endpoint 40b, sends an OLC message to H.323 endpoint 40a at message 228 to establish a media path using one or more capabilities from TCS message 214. H.323 endpoint 40 acknowledges the OLC message by responding with an OLC ACK at message 230. The OLC ACK includes, for example, addressing and port information describing where to send the media.

At instance 232, call manager 30 initiates a timer to consolidate signaling if H.323 endpoint 40a desires to send media to SIP endpoint 40b. The timer may be configured to run for any suitable time period. Call manager 30 consolidates the messages from H.323 endpoint 40a to reduce the exchange of messages sent to SIP endpoint 40b as described above. For example, rather than sending an ACK with an SDP answer indicating a send-only directionality to SIP endpoint 40b immediately following receipt of the OLC ACK, call manager 30 waits to receive an OLC from H.323 endpoint 40a that indicates its desire to establish a bidirectional flow.

Call manager 30 then sends an ACK message 236 with an SDP answer indicating a bidirectional session has been established. For example, the acknowledgement includes a media line that contains capabilities extracted from the TCS exchange, the port information from the OLC ACK in message 230, and any other suitable information to establish the media path. Call manager 30 sends an OLC ACK to H.323 endpoint 40a at message 238. This OLC ACK includes capability and port information that was sent by SIP endpoint 40b in the SDP offer contained in the 200 OK message 206. At 240, following successful establishment of a bidirectional session, media packets flow directionally between H.323 endpoint 40a and SIP endpoint 40b.

In an embodiment, call manager 30 may not receive OLC 234 and the timer on call manager 30 expires. If this occurs, call manager 30 may send ACK 236 to SIP endpoint 40b with an SDP answer indicating that media will flow unidirectionally from SIP endpoint 40b to H.323 endpoint 40a.

Figure 3:
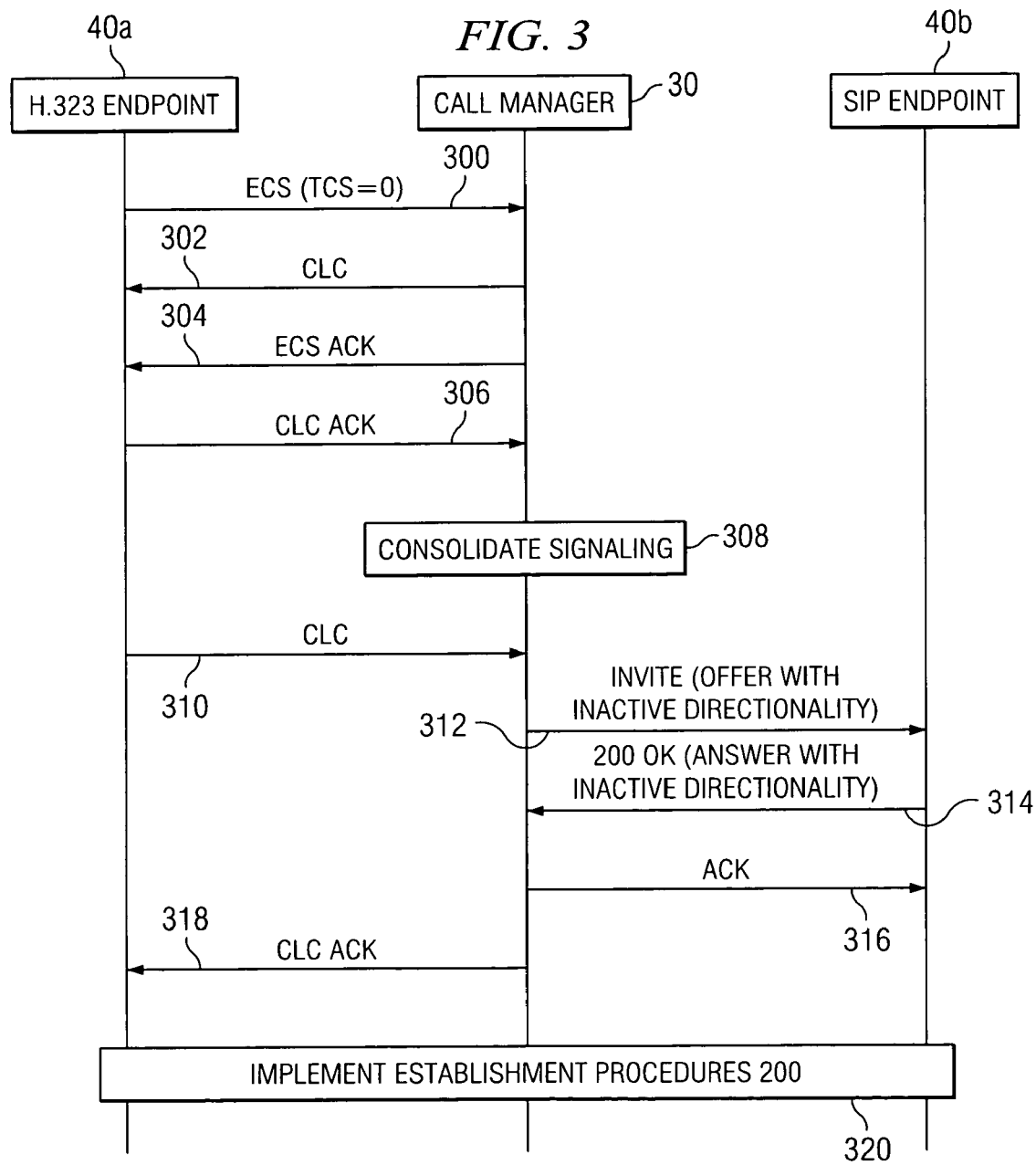
FIG. 3 is a call-flow diagram illustrating the consolidation of media signaling during mid-call renegotiation of the audio call.

FIG. 3 is a call-flow diagram illustrating the consolidation of media signaling during mid-call renegotiation of the audio call. During a call, a user may implement various features that renegotiate the media signaling mid-call. For example, mid-call renegotiation occurs when endpoint 40 places another endpoint 40 on hold or resumes a call after placing endpoint 40 on hold, transfers endpoint 40 to another endpoint 40, a conferencing operation, or any other suitable occurrence.

In the illustrated embodiment, H.323 endpoint 40a initiates the feature that results in the mid-call renegotiation. H.323 endpoint 40a sends an empty capability set (ECS), which is a TCS without any capabilities, to call manager 30 at message 300. Per the H.323 standard, call manager 30 immediately closes the media channel flowing from SIP endpoint 40b to H.323 endpoint 40a in response to the ECS by sending a close logical channel (CLC) to H.323 endpoint 40a at message 302 and acknowledges the ECS with an ECS ACK in message 304. In an embodiment, call manager 30 may or may not close the channel flowing from H.323 endpoint 40a to SIP endpoint 40b. H.323 endpoint 40a sends a CLC ACK to call manager 30 at message 306, which provides acknowledgement of the CLC in message 302.

At instance 308, call manager 30 initiates a timer that provides for consolidating the signaling that provides for closing the media path. In the illustrated embodiment, call manager 30 receives a CLC during the time period from H.323 endpoint 40a at message 310. Call manager 30 sends an INVITE, with an SDP offer indicating that the media session should be deactivated bidirectionally, to SIP endpoint 40b at message 312. SIP endpoint 40b responds with a 200 OK, with an SDP answer, at message 314. Call manager 30 sends an ACK message acknowledging the 200 OK at message 316 and acknowledges the CLC at message 318. If an endpoint 40 re-opens the media channel, establishment procedures 200 from FIG. 2 are implemented which proceed at 320.

In an embodiment, a user may implement a music-on-hold feature that requires renegotiation of media signaling mid-call. In this case, call manager 30 does not receive a CLC message from H.323 endpoint 40a during the initiated time period because H.323 endpoint 40a continues to send media to SIP endpoint 40b, but does not receive media from SIP endpoint 40b. Therefore, call manager 30 sends an INVITE to SIP endpoint 40b with an SDP offer that establishes a unidirectional media path between H.323 endpoint 40a and SIP endpoint 40b. Using the unidirectional media path, H.323 endpoint 40a sends media, in this case music, to SIP endpoint 40b, but does not receive media from SIP endpoint 40b.

Figure 4:
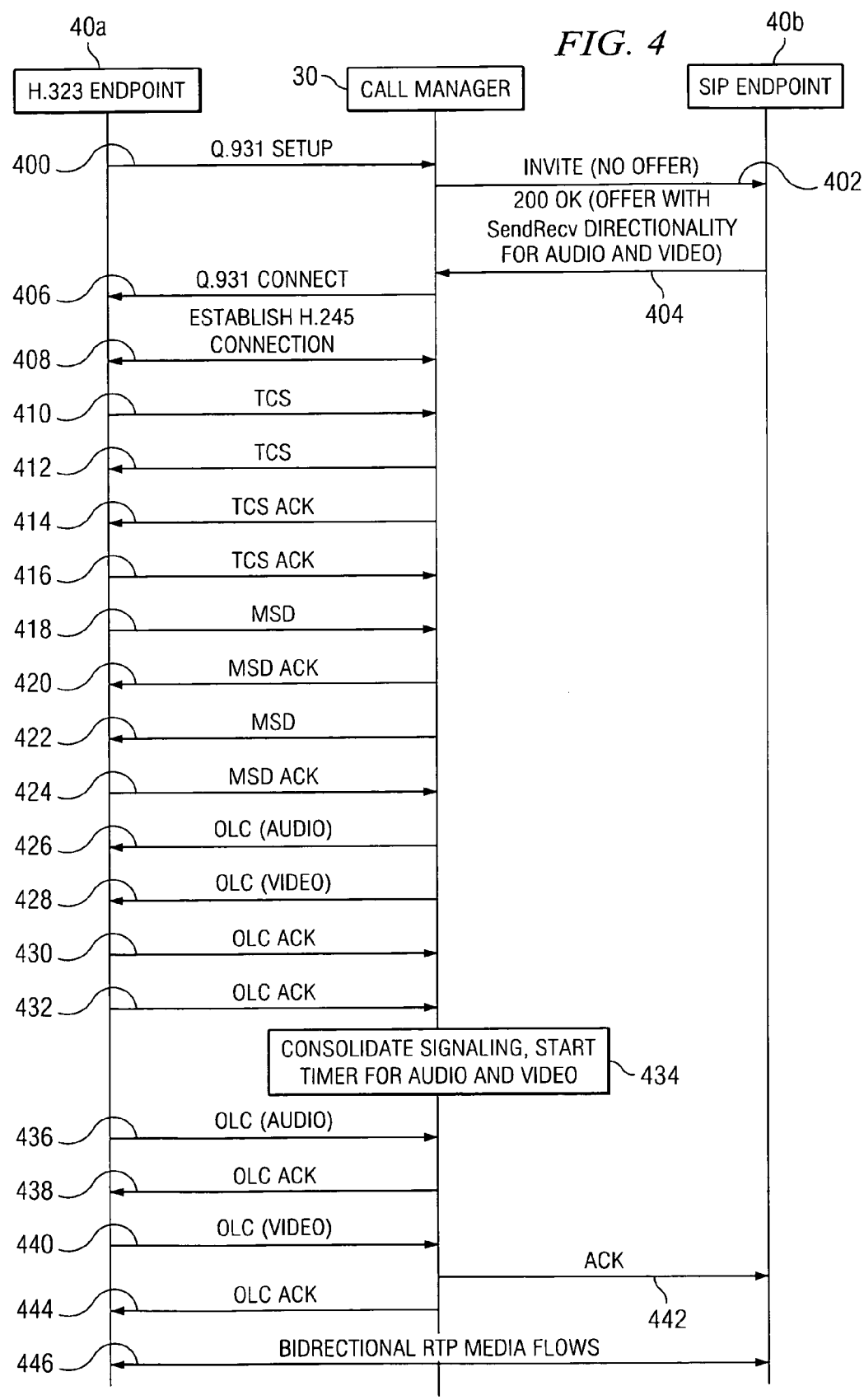
FIG. 4 is a call-flow diagram illustrating the consolidation of media signaling during establishment of an audio and video call.

FIG. 4 is a call-flow diagram illustrating the consolidation of media signaling during establishment of an audio and video call. During a call that exchanges multiple media types, a channel exists for each media type.

Negotiation of the audio and video call is implemented using an H.245 slow-start method. In this method, a separate H.245 channel is established, rather than embedding Fast-Start elements directly into the Q.931 messages. H.323 endpoint 40a sends a Q.931 setup to call manager 30 at message 400. Q.931 is used to establish a TCP connection for H.245. Call manager 30 sends an empty INVITE to SIP endpoint 40b at message 402. As discussed above, the INVITE conforms to the RFC3264 offer-answer procedures as a delayed offer, and therefore, does not include an SDP message containing specific session establishment information about the call, but establishes the possibility of a call between H.323 endpoint 40a and SIP endpoint 40b. SIP endpoint 40b replies by sending a 200 OK at message 404, which includes an SDP offer containing port information for SIP endpoint 40b and other capabilities of SIP endpoint 40b if a media path is to be established between H.323 endpoint 40a and SIP endpoint 40b. Because this example is for audio and video, the 200 OK response includes capabilities for audio and video. The 200 OK includes an offer that is bidirectional with send/receive capabilities. Call manager 30 sends a Q.931 connect message

406 to H.323 endpoint 40a, which indicates that SIP endpoint 40b has answered the call. In another embodiment, SIP endpoint 40b sends a provisional response indicating, for example, that the endpoint is ringing and call manager 30 sends a corresponding Q.931 alerting message. H.323 endpoint 40a establishes an H.245 connection with call manager 30 at message 408. The H.245 protocol is used to control the establishment and closure of media channels within the context of a call and to perform conference control.

H.323 endpoint 40a sends a TCS message to call manager 30 at message 410 with its capabilities. The TCS message includes the media capabilities, such as the type of codes H.323 endpoint 40a is able to use. Call manager 30 sends a TCS message to H.323 endpoint 40a at message 412. This TCS contains capabilities that correspond to those received in the SDP offer message contained in the 200 OK response in message 404. Each TCS message is acknowledged between H.323 endpoint 40a and call manager 30 in messages 414 and 416.

A master/slave determination (MSD) then occurs. For example, H.323 endpoint 40a sends a MSD to call manager 30 in message 418, and call manager 30 acknowledges the MSD in message 420. The inverse occurs in following messages with call manager 30 sending a MSD to H.323 endpoint 40a in message 422, and H.323 endpoint 40a acknowledging the MSD in message 424.

Call manager 30 sends an OLC for audio in message 426 and sends an OLC for video in message 428. As discussed above, each media type has an associated channel. H.323 endpoint 40a acknowledges the OLC of each channel with an OLC ACK in messages 430 and 432.

Call manager 30 starts a timer to consolidate additional messages received at instance 434. H.323 endpoint 40a sends an OLC for the audio at message 436. At message 438, call manager 30 acknowledges the audio OLC using information derived from the audio capabilities and ports received in the SIP 200 OK with SDP offer in message 404. In the illustrated embodiment, because the timer is still running and has not expired, call manager 30 still expects an OLC for the video. Therefore, the consolidation delay continues and no SIP activity occurs. When H.323 endpoint 40 a sends an OLC for video at message 440, the timer is canceled because all expected channels have been opened.

Call manager 30 consolidates the media signaling and sends an ACK in message 442, with an SDP answer containing information to open both audio and video bidirectional channels, to SIP endpoint 40b. Call manager 30 also acknowledges the OLC for video at message 444. At message 446, media, which in this embodiment includes audio and video, flows bidirectionally between H.323 endpoint 40a and SIP endpoint 40b.

Modifications, additions, or omissions may occur in the call flow diagrams presented in FIGS. 2, 3, and 4. For example, the call-flows may include initiation of the call from SIP endpoint 40b and providing consolidated signaling to H.323 endpoint 40a. As another example, if call manager 30 does not receive a message before the timer expires, call manager 30 does not consolidate messages and additional messages are sent. The call-flows may include more, fewer, or other messages. Additionally, messages may be performed in any suitable order.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for consolidating media signaling to facilitate Internet Protocol (IP) telephony, comprising:
    receiving a first message exchange in a first protocol from a first endpoint to open a first unidirectional media connection by negotiating a media path with a second endpoint;
    determining to consolidate the first message exchange with additional message exchanges received from the first endpoint in the first protocol, wherein determining to consolidate the first message exchange with the additional message exchanges comprises;
        activating a timer to begin consolidation, wherein the timer expires according to a time period; and
        determining whether the timer expires;
    reactivating the timer to consolidate additional message exchanges received from the first endpoint if the timer expires and if additional message exchanges can be consolidated;
    receiving a second message exchange in the first protocol from the first endpoint to open a second unidirectional media connection;
    consolidating information derived from the first message exchange and the second message exchange within the time period;
    initiating a first message exchange in a second protocol to the second endpoint according to the information consolidated from the first and second message exchanges in the first protocol, wherein the first message exchange in the second protocol opens a bidirectional media connection;
    facilitating one or more unidirectional media flows over the media path between the first and second endpoints according to a message exchange in the first protocol if the first and second message exchanges in the first protocol are not consolidated within the time period; and
    facilitating one or more bidirectional media flows over the media path between the first and second endpoints according to the first and second message exchanges in the first protocol and the first message exchange in the second protocol if the first and second message exchanges in the first protocol are consolidated.

2. The method of claim 1, wherein the first endpoint is an H.323 endpoint and the first protocol is H.323, and the second endpoint is a Session Initiation Protocol (SIP) endpoint and the second protocol is SIP.

3. The method of claim 1, wherein the first endpoint is a SIP endpoint and the first protocol is SIP, and the second endpoint is an H.323 endpoint and the second protocol is H.323.

4. The method of claim 1, wherein the first and second message exchanges in the first protocol are a request to open unidirectional media connections and the first message exchange in the second protocol opens a bidirectional media connection.

5. The method of claim 1, wherein the first and second message exchanges in the first protocol and the first message exchange in the second protocol close a media connection.

6. The method of claim 1, wherein facilitating one or more media flows over the media path between the first and second endpoints comprises facilitating the exchange of audio and video between the first and second endpoints.

7. A computer-readable medium encoding software for consolidating media signaling to facilitate Internet Protocol (IP) telephony, the software, when executed, operable to:

receive a first message exchange in a first protocol from a first endpoint to open a first unidirectional media connection by negotiating a media path with a second endpoint;

determine to consolidate the first message exchange with additional message exchanges received from the first endpoint in the first protocol, wherein determining to consolidate the first message exchange with the additional message exchanges comprises;

activating a timer to begin consolidation, wherein the timer expires according to a time period; and determining whether the timer expires;

reactivating the timer to consolidate additional message exchanges received from the first endpoint if the timer expires and if additional message exchanges can be consolidated;

receive a second message exchange in the first protocol from the first endpoint to open a second unidirectional media connection;

consolidate information derived from the first message exchange and the second message exchange within the time period;

initiate a first message exchange in a second protocol to the second endpoint according to the information consolidated from the first and second message exchanges in the first protocol, wherein the first message exchange in the second protocol opens a bidirectional media connection;

facilitate one or more unidirectional media flows over the media path between the first and second endpoints according to a message exchange in the first protocol if the first and second message exchanges in the first protocol are not consolidated within the time period; and facilitate one or more bidirectional media flows over the media path between the first and second endpoints according to the first and second message exchanges in the first protocol and the first message exchange in the second protocol if the first and second message exchanges in the first protocol are consolidated.

8. The computer readable medium of claim 7, wherein the first endpoint is an H.323 endpoint and the first protocol is H.323, and the second endpoint is a Session Initiation Protocol (SIP) endpoint and the second protocol is SIP.

9. The computer readable medium of claim 7, wherein the first endpoint is a SIP endpoint and the first protocol is SIP, and the second endpoint is an H.323 endpoint and the second protocol is H.323.

10. The computer readable medium of claim 7, wherein the first and second message exchanges in the first protocol are a request to open unidirectional media connections and the first message exchange in the second protocol opens a bidirectional media connection.

11. The computer readable medium of claim 7, wherein the first and second message exchanges in the first protocol and the first message exchange in the second protocol close a media connection.

12. The computer readable medium of claim 7, wherein facilitating the one or more media flows over the media path between the first and second endpoints comprises facilitating the exchange of audio and video between the first and second endpoints.

13. A system for consolidating media signaling to facilitate Internet Protocol (IP) telephony, comprising:

a first endpoint and a second endpoint operable to exchange media, wherein the first endpoint communicates using a first protocol and the second endpoint communicates using a second protocol; and a call manager operable to:

receive a first message exchange in a first protocol from a first endpoint to open a first unidirectional media connection by negotiating a media path with a second endpoint;

determine to consolidate the first message exchange with additional message exchanges received from the first endpoint in the first protocol, wherein determining to consolidate the first message exchange with the additional message exchanges comprises;

activating a timer to begin consolidation, wherein the timer expires according to a time period; and determining whether the timer expires;

reactivating the timer to consolidate additional message exchanges received from the first endpoint if the timer expires and if additional message exchanges can be consolidated;

receive a second message exchange in the first protocol from the first endpoint to open a second unidirectional media connection;

consolidate information derived from the first message exchange and the second message exchange within the time period;

initiate a first message exchange in a second protocol to the second endpoint according to the information consolidated from the first and second message exchanges in the first protocol, wherein the first message exchange in the second protocol opens a bidirectional media connection;

facilitate one or more unidirectional media flows over the media path between the first and second endpoints according to a message exchange in the first protocol if the first and second message exchanges in the first protocol are not consolidated within the time period; and facilitate one or more bidirectional media flows over the media path between the first and second endpoints according to the first and second message exchanges in the first protocol and the first message exchange in the second protocol if the first and second message exchanges in the first protocol are consolidated.

14. The system of claim 13, wherein the first endpoint is an H.323 endpoint and the first protocol is H.323, and the second endpoint is a Session Initiation Protocol (SIP) endpoint and the second protocol is SIP.

15. The system of claim 13, wherein the first endpoint is a SIP endpoint and the first protocol is SIP, and the second endpoint is an H.323 endpoint and the second protocol is H.323.

16. The system of claim 13, wherein the first and second message exchanges in the first protocol are a request to open unidirectional media connections and the first message exchange in the second protocol opens a bidirectional media connection.

17. The system of claim 13, wherein the first and second message exchanges in the first protocol and the first message exchange in the second protocol close a media connection.

18. The system of claim 13, wherein facilitating the one or more media flows over the media path between the first and second endpoints comprises facilitating the exchange of audio and video between the first and second endpoints.

19. A system for consolidating media signaling to facilitate Internet Protocol (IP) telephony, comprising:

means for receiving a first message exchange in a first protocol from a first endpoint to open a first unidirectional media connection by negotiating a media path with a second endpoint;

means for determining to consolidate the first message exchange with additional message exchanges received from the first endpoint in the first protocol, wherein means for determining to consolidate the first message exchange with the additional message exchanges comprises:
  activating a timer to begin consolidation, wherein the timer expires according to a time period; and
  determining whether the timer expires;
reactivating the timer to consolidate additional message exchanges received from the first endpoint if the timer expires and if additional message exchanges can be consolidated;
means for receiving a second message exchange in the first protocol from the first endpoint to open a second unidirectional media connection;
means for consolidating information derived from the first message exchange and the second message exchange within the time period;
means for initiating a first message exchange in a second protocol to the second endpoint according to the information consolidated from the first and second message exchanges in the first protocol, wherein the first message exchange in the second protocol opens a bidirectional media connection;
means for facilitating one or more unidirectional media flows over the media path between the first and second endpoints according to a message exchange in the first protocol if the first and second message exchanges in the first protocol are not consolidated within the time period; and
means for facilitating one or more bidirectional media flows over the media path between the first and second endpoints according to the first and second message exchanges in the first protocol and the first message exchange in the second protocol if the first and second message exchanges in the first protocol are consolidated.

* * * * *

UNITED STATES PATENT AND TRADEMARK OFFICE
CERTIFICATE OF CORRECTION

PATENT NO. : 7,596,150 B2
APPLICATION NO. : 11/363810
DATED : September 29, 2009
INVENTOR(S) : Baird et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 276 days.

Signed and Sealed this

Twenty-eighth Day of September, 2010

David J. Kappos
*Director of the United States Patent and Trademark Office*